(12) United States Patent
Piovan

(10) Patent No.: US 10,119,651 B2
(45) Date of Patent: Nov. 6, 2018

(54) UPRIGHT COLUMN STAND

(71) Applicant: Giorgio Piovan, Los Angeles, CA (US)

(72) Inventor: Giorgio Piovan, Los Angeles, CA (US)

( * ) Notice: Subject to any disclaimer, the term of this patent is extended or adjusted under 35 U.S.C. 154(b) by 39 days.

(21) Appl. No.: 15/051,097

(22) Filed: Feb. 23, 2016

(65) Prior Publication Data

US 2016/0245453 A1    Aug. 25, 2016

Related U.S. Application Data

(60) Provisional application No. 62/120,235, filed on Feb. 24, 2015.

(51) Int. Cl.
*F16M 11/04* (2006.01)
*A47B 19/00* (2006.01)

(52) U.S. Cl.
CPC ......... *F16M 11/048* (2013.01); *A47B 19/002* (2013.01); *F16M 11/046* (2013.01)

(58) Field of Classification Search
CPC ........ F16M 11/10; F16M 11/16; F16M 11/28; F16M 11/38; F16M 11/2021; F16M 11/21; F16M 11/26; F16M 11/046; F16M 11/048; F16M 2200/08; F16M 2200/028; G10G 5/00; A47B 19/002; A47B 2019/006
USPC ............................. 248/122.1, 125.1; 84/327
See application file for complete search history.

(56) References Cited

U.S. PATENT DOCUMENTS

| | | | |
|---|---|---|---|
| 4,770,380 A | | 9/1988 | Eason et al. |
| 5,149,905 A | * | 9/1992 | Count ...................... G10H 1/32 248/122.1 |
| 5,199,930 A | * | 4/1993 | Weber ..................... A63K 3/043 108/117 |
| 5,392,476 A | * | 2/1995 | Williams .................. A45F 3/24 248/166 |
| 5,509,629 A | * | 4/1996 | Sassmannshausen ....................... F16M 11/16 248/169 |
| 5,681,017 A | * | 10/1997 | Clausen ............. A47B 21/0314 108/146 |
| 5,979,856 A | * | 11/1999 | Hsu ....................... A47B 19/002 248/441.1 |
| 5,996,814 A | * | 12/1999 | Workman ............ B25H 1/0014 211/22 |
| 6,316,706 B1 | * | 11/2001 | Sammons ............ A47B 19/002 84/327 |
| 6,814,332 B2 | * | 11/2004 | Eason ................... F16M 11/048 248/122.1 |
| 7,336,258 B1 | * | 2/2008 | Goetsch ................. F16M 11/14 248/278.1 |
| 7,928,304 B2 | * | 4/2011 | Eason ................... F16B 7/0486 84/412 |
| 7,932,451 B2 | | 4/2011 | Workman et al. |

(Continued)

FOREIGN PATENT DOCUMENTS

| | | |
|---|---|---|
| CA | 2105737 | 3/1995 |
| JP | 3009699 | 7/1995 |
| JP | 10318775 B4 | 10/2005 |

*Primary Examiner* — Patrick D Hawn
(74) *Attorney, Agent, or Firm* — Sanford Astor

(57) ABSTRACT

A column stand for holding items comprising one or more clamps attached to the column stand, each clamp having slots in the top of the clamp, one or more trays, each tray fixedly attached to a bar, each bar fitting into a slot, a clasp attached to the top of each clamp, each clasp holding each bar to the clamp.

7 Claims, 10 Drawing Sheets

(56) References Cited

U.S. PATENT DOCUMENTS

| | | | | |
|---|---|---|---|---|
| 7,938,372 B2* | 5/2011 | MacLeod | ............... | A47B 21/00 |
| | | | | 108/10 |
| 8,128,043 B2* | 3/2012 | Walter | ................. | A47B 96/061 |
| | | | | 248/221.11 |
| 8,367,919 B2* | 2/2013 | Belitz | ..................... | G10G 5/00 |
| | | | | 84/453 |
| 8,464,988 B1 | 6/2013 | Walker | | |
| 8,800,455 B2* | 8/2014 | Monroe | ................. | B62B 3/004 |
| | | | | 108/15 |
| 9,644,785 B2* | 5/2017 | Carpenter | .............. | F16M 11/24 |
| 2002/0100852 A1 | 8/2002 | Eason et al. | | |
| 2003/0052237 A1* | 3/2003 | Yu | ....................... | A47B 19/002 |
| | | | | 248/125.8 |
| 2008/0135697 A1* | 6/2008 | Workman | .............. | F16M 11/16 |
| | | | | 248/177.1 |
| 2009/0224113 A1* | 9/2009 | Voorhees | ........... | A47B 21/0314 |
| | | | | 248/122.1 |

\* cited by examiner

UPRIGHT COLUMN STAND

CROSS-REFERENCE TO RELATED APPLICATIONS

This application claims the benefit of U.S. provisional application Ser. No. 62/120,235 filed Feb. 24, 2015, the disclosure(s) of which is hereby incorporated in its entirety by reference herein.

TECHNICAL FIELD

The invention relates to stands and supports for holding items such as laptops, small electronics, medical equipment and industrial equipment. More particularly, this invention relates to upright column stands utilized for holding musical keyboard instruments and related items.

BACKGROUND

Some accessories for column keyboard stands have been used previously, which claim to offer a solution for holding laptops and small electronics. Typically such accessories are sheet music holders adapted to try to become laptop holders. These are an unstable and unsafe solution. Another solution for holding laptops has been a couple of support arms usually attached in the center, at the very top of the column, in an inconvenient and not height-adjustable position. The support arms on top of the column are an especially bad idea for a number of reasons, such as the fact that anything placed on top of the column at its maximum height, with no options for being height adjustable, needs to be sharply angled in order to be operated, creating an unwanted physical barrier between the performer and the audience, right at the level of the performer's face. Also, it is not suitable for short people who may have troubles reaching up for their laptop at that height.

As a demonstration that these accessories have not provided a suitable solution to the problem is the fact that, still to today, keyboard players either place their laptops on a chair or on a separate dedicated stand on the side of their keyboard stand, or attach a board to the second tier of the keyboard stand, on top of which they can put their laptop but, by doing this, they give up the space for a second keyboard.

Particularly a new type of artist, the keyboard player/DJs, who play not only keyboards but also operate drum machines and a number of small electronics and utilize one or more laptops as well, not having found a stand that is suitable for holding all the many pieces of gear they need, are utilizing a table for supporting their gear during their performances.

This invention not only presents the optimal placement for one or more laptops, but also offers a number of additional advantages in terms of optimizing the capability of the column stand to hold many more useful pieces of equipment, all of them in a very ergonomic position, without blocking the view of the keyboards, with a minimal physical barrier between the performer and the audience, and without renouncing the second keyboard.

The invention now provides a column stand that can be transformed into a totally new evolved concept of stand, which is a hybrid between a traditional keyboard stand and a table. The invention can transform a column keyboard stand into a full-blown workstation that is suitable for keyboard players, DJs and producers and, because it is height-adjustable at any vertical point along the column, it can be utilized at its full capability on a lowered as well as on a raised position and every position in between, making it a perfect solution for musicians of every stature, for standing musicians playing live, as well as for musicians sitting down through long studio or rehearsal sessions.

SUMMARY

In accordance with the present invention there is provided a unique accessory that holds laptops, small electronics, and other gear which can be detachably fastened to an upright slanted column stand, providing an optimal ergonomic positioning of the supported gear, which has not been available heretofore. The invented accessory includes (a) a bar member that is attached to the support column, by means of a clamp which can be blocked at any desired height along the longitudinal extension of the column, and is extending horizontally on either sides of the column, (b) a tray member, that can either be soldered on top of the bar along its front longitudinal border to provide a fixed support, flat and horizontal, or a tray member that can slide and rotate on top of the bar and be secured to the bar at any desired angle and a back/forth position, extending from each side of the column outwardly, (c) a blocking mechanism member which secures the sliding/rotating version of the tray to the bar, (d) a clasp member, that can be detachably screwed to a clamp, which is designed to firmly secure the bar to the clamp, which also provides standard threaded attachments for additional arms and goosenecks that can be utilized to hold more gear items, and (e) a modified clamp member having a hole with a nut where a bolt can be screwed to firmly fasten the clasp to the clamp, blocking the bar.

Both versions of the invention, the fixed tray and the sliding/rotating tray, are supported by the column in the same way, the only difference being how the tray is attached to the bar, in either a fixed or a sliding/rotating manner.

DETAILED DESCRIPTION

Figure 1:
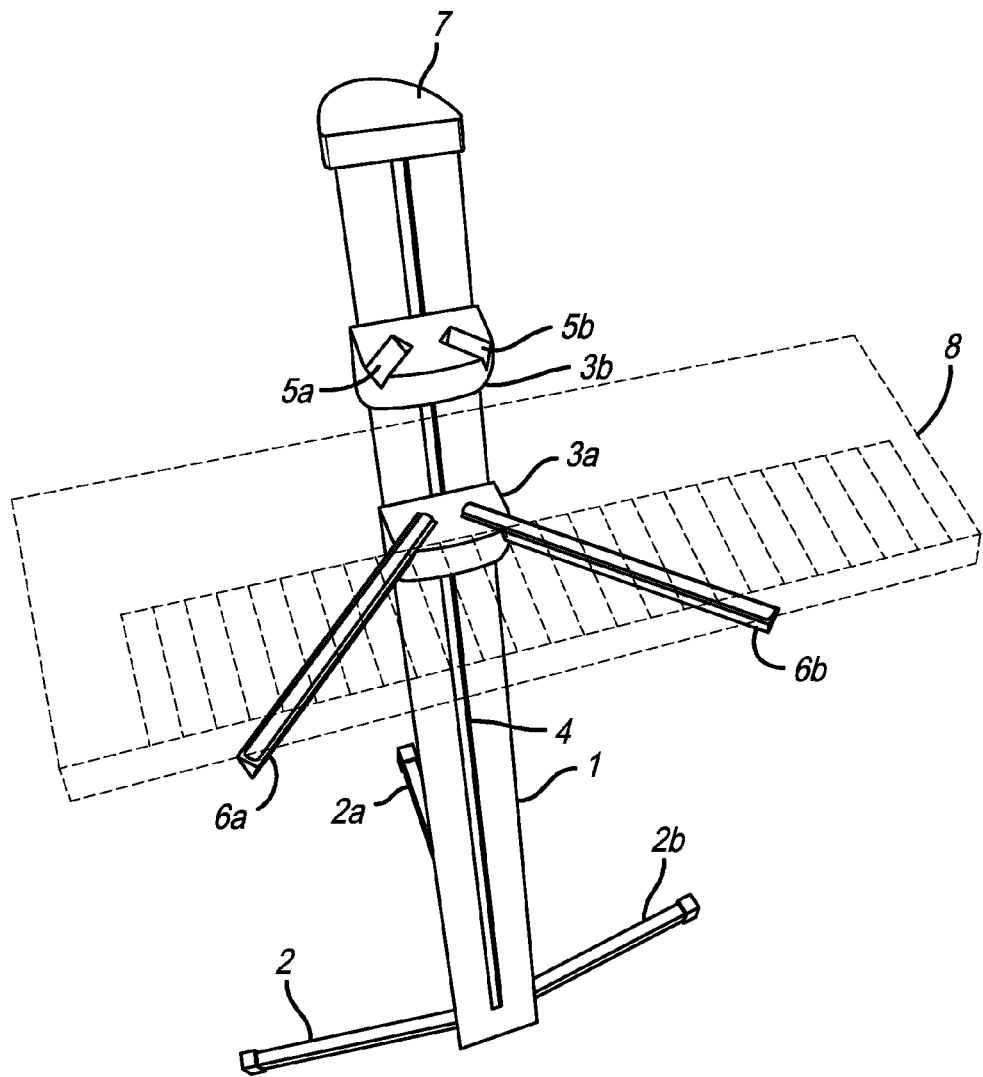
FIG. 1 is a perspective view of a prior art column stand.
Figure 2:
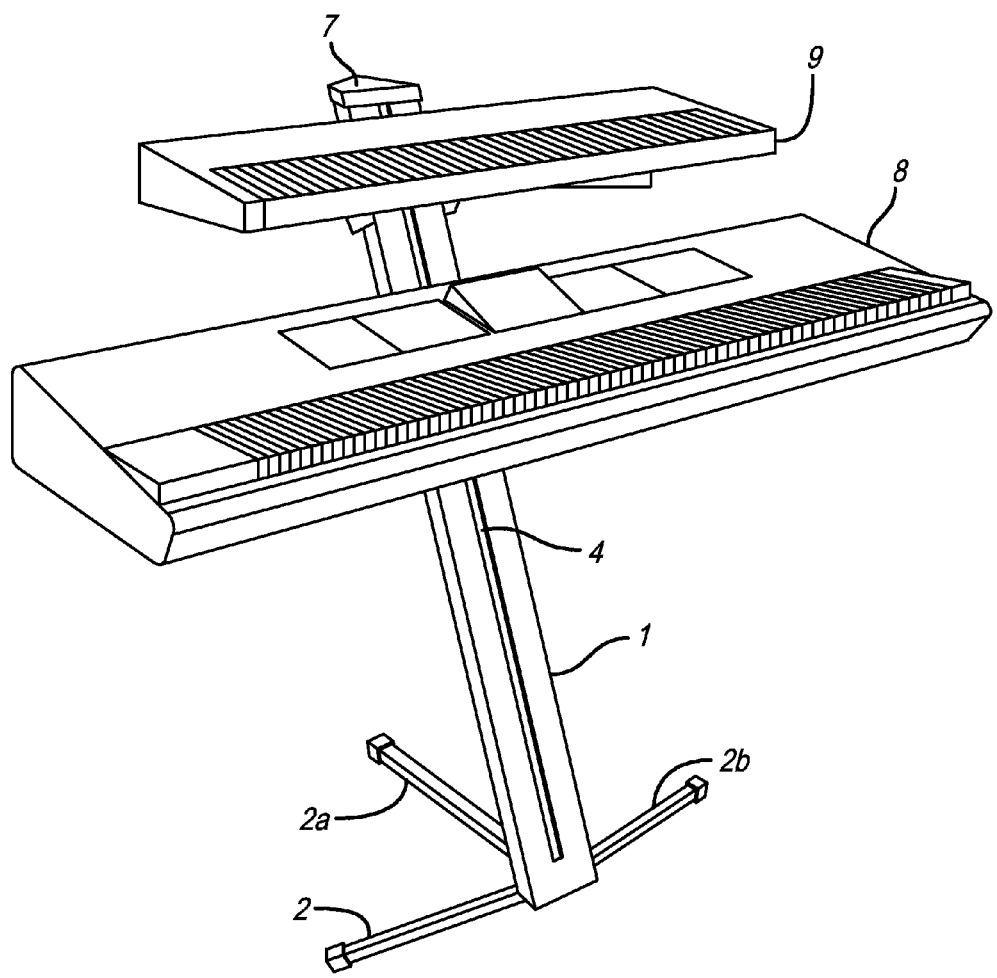
FIG. 2 is a perspective view of the prior art column stand holding two keyboards.

FIGS. 1 and 2 show the prior art in which there is a common column stand 1 having three support legs 2, 2a and 2b. Clamps 3a and 3b are attached to column stand 1 in vertical slot 4. In other prior art stands, clamps 3a and 3b are attached to the sides of the stand.

Each clamp 3a and 3b has two angled slots 5a and 5b into which bars 6a and 6b fit, extending out at an angle, used to support keyboards. Each angled slot 5a and 5b is triangular in shape, set at approximately 45 degrees forward of column stand 1. There is a cap 7 at the top of the column 1. FIG. 2 shows two keyboards 8 and 9 sitting on bars, such as 6a and 6b, showing the common use of stand 1. In order to properly function with the invention, clamps 3a and/or 3b need to be modified as will be explained below.

FIGS. 3-6 illustrate details of the fixed version of the invention and there is alternatively a sliding/rotating version, as will be explained below.

Referring to FIGS. 3-6, there is shown left tray member 10 which is soldered to angled bar 11 and right tray member 12 which is soldered to angled bar 13 to form the left and right fixed version of the invention. A clamp 14, (such as 3a or 3b) is utilized to hold two trays 10 and 12 by giving support to angled bars 11 and 13 to which trays 10 and 12 are soldered. Clamp 14 exists in prior art stands and in order to properly function with the invention, clamp 14 needs to be modified as will be explained below. Other prior art clamps have slots that are straight across the clamp and others at different angles. The bars 11 and 13 can be adjusted from straight to any angle.

A new item clasp 16 is attached on the top of clamp 14 with a bolt 17 that is screwed into hole 15, which has been threaded, such that clasp 16 keeps trays 10 and 12 horizontally and firmly in place by securing angled bars 11 and 13 to clamp 14. Trays 10 and 12 may have different sizes and shapes.

An angled bar 11, triangular cross-section in shape is soldered underneath and along the front margin of left tray 10 to hold tray 10 securely. Symmetrically, angled triangular bar member 13 is soldered underneath and along the front margin of right tray 12 to hold tray 12 securely. Angled bar members 11 and 13 are detachably attached to clamp 14 so that trays 10 and 12 are set respectively to the left and right side of clamp 14 and positioned horizontally toward the back of the column stand.

Figure 3:
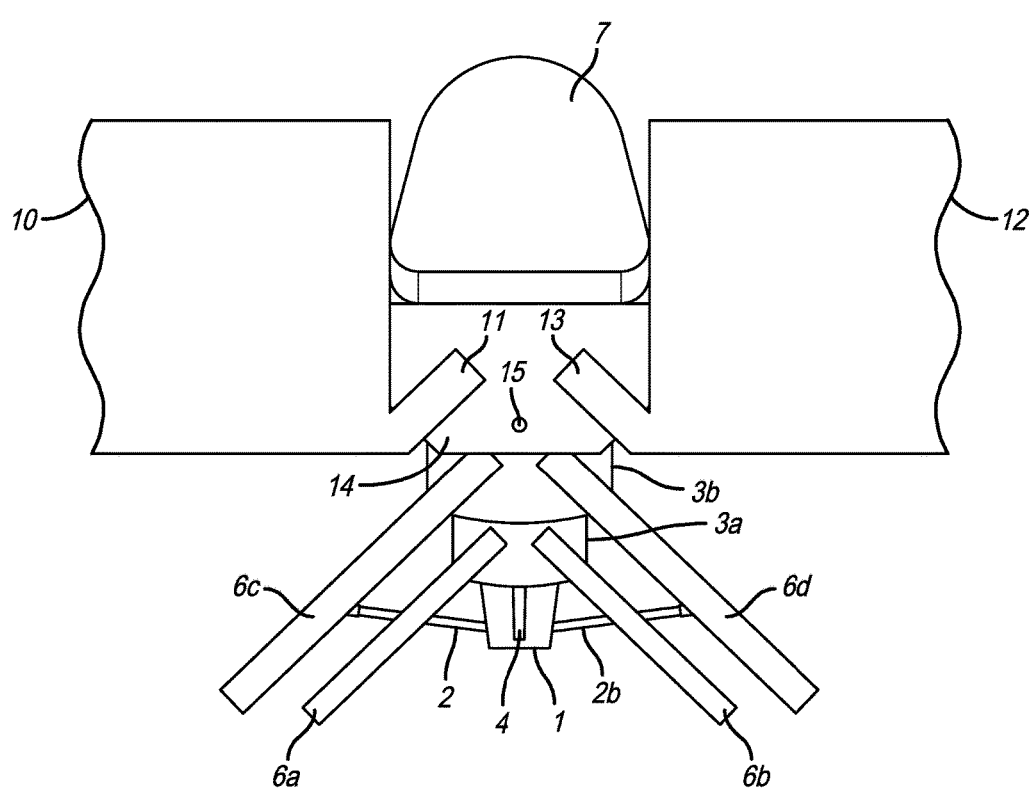
FIG. 3 is a top view of two trays, two sets of bars and three clamps.

FIG. 3 shows angled bar 11 fully engaged into slot 5a and angled bar 13 fully engaged into another slot 5b on the other side. When angled bar 11 is fully engaged into slot 5a, tray 10 reaches its target position on the left side of clamp 14, perfectly horizontal and toward the back of column stand 1. When angled bar 13 is fully engaged into slot 5b tray 12 reaches its target position on right side of clamp 14, perfectly horizontal and toward the back of column stand 1. Slots 5a and 5b are part of clamp 14, existing in prior art column stand 1. Slots 5a and 5b in the prior art, clamp 3a or 3b were and are used by the prior art to receive two straight bars 6a and 6b which protrude toward the front of the column stand 1 at a reciprocal angle of 45° each and are utilized to hold a keyboard.

Figure 4:
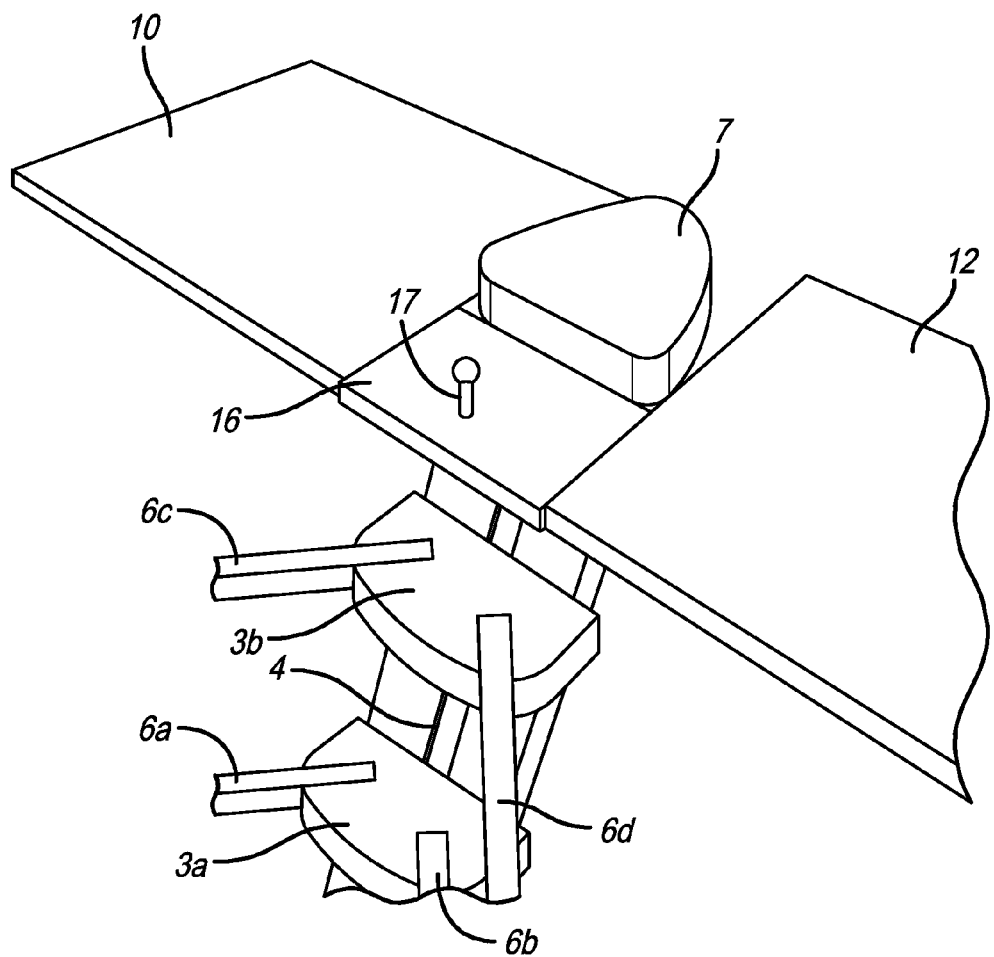
FIG. 4 is a perspective view of the two trays, the clamp and the clasp.

Referring to FIGS. 3 and 4, there are shown identical clamp members 14, 3A and 3B utilized as parts of an existing prior art stand to hold keyboards in two tiers in the front area of the column stand by means of two bars 6a and 6b for each clamp 3A and 3B, engaged in slots identical to slots 5a and 5b of clamp 14 which are present in each clamp 3A and 3B, at a mutual angle of 45°, on top of which keyboards can rest. Clamp 14 of the invention is identical to clamps 3A and 3B, with the only exception being a threaded hole 15 drilled in the front central part of clamp 14. Clamp 14 serves as support for left tray 10 and right tray 12 which are respectively sustained by angled bars 11 and 13 fully engaged into slots 5a and 5b.

Clamp 14, initially identical to clamps 3A and 3B, originally does not have a threaded hole in the center top part. The invention requires a threaded hole 15 to be drilled in the center top part of clamp 14. There is shown a threaded hole 15 drilled into clamp 14. Threaded hole 15 may be drilled into the body of clamp 14. Alternatively, a passing-through hole 15, not threaded may be drilled through clamp 14, a threaded bolt 17 passed through hole 15 and a threaded metal nut placed secured to bolt 17 at the bottom of hole 15 where a metal threaded nut can receive bolt 17 unseen under the clamp, the clasp also unseen. Considering the continuous stress of setting up and breaking down the stand in live performances, using a bolt passed through the hole and a threaded metal nut attached to the bolt at the bottom of hole 15 is a more reliable alternative to a threaded hole.

Threaded hole 15 or unthreaded hole 15 will receive bolt 17, and either fully screwed into threaded hole 15, or bolt with a threaded nut firmly attaches clasp 16 to clamp 14 and blocks in place the angled bars 11 and 13, fully engaged into slots 5a and 5b, preventing angled bars 11 and 13 from sliding out of slots 5a and 5b and firmly securing trays 10 and 12 horizontally in place, completely preventing any chance of a loose joint.

Figure 12:
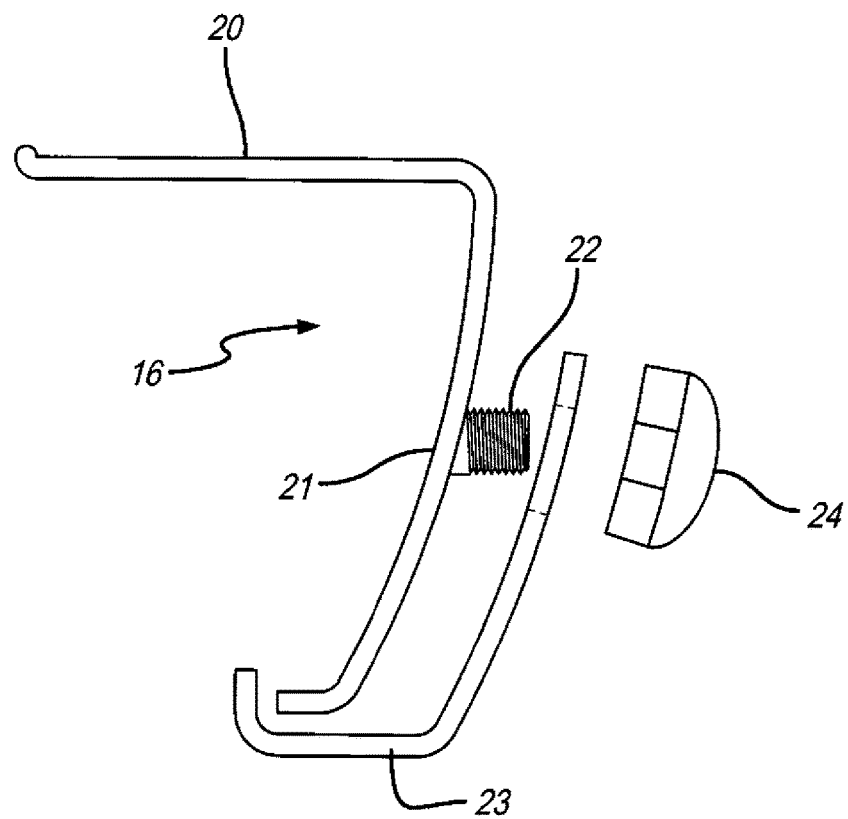
FIG. 12 is a side view of the clasp and clamp.

FIG. 12 depicts an alternative way of securing a clasp to clamp 14 without having to drill a threaded hole is an L-shaped clasp 16 which is placed on top of clamp 14 with the top facet 20 of the clasp 16 covering the entire top of clamp 14 and the front vertical facet 21 of clasp 16 adhering to the front vertical face of clamp 14. A bolt 22 is attached in the center of the front vertical facet 21 of the clasp 16. A separate flange 23, shaped to adhere to the front vertical facet 21 of the L-shaped clasp engages the bottom of clamp 14. Bolt 22 passes through flange 23. A nut 24 is screwed on the bolt 22 attached in the center of the front vertical face of clasp 16, which firmly attaches the flange 23 to L-shaped clasp 16.

Figure 5:
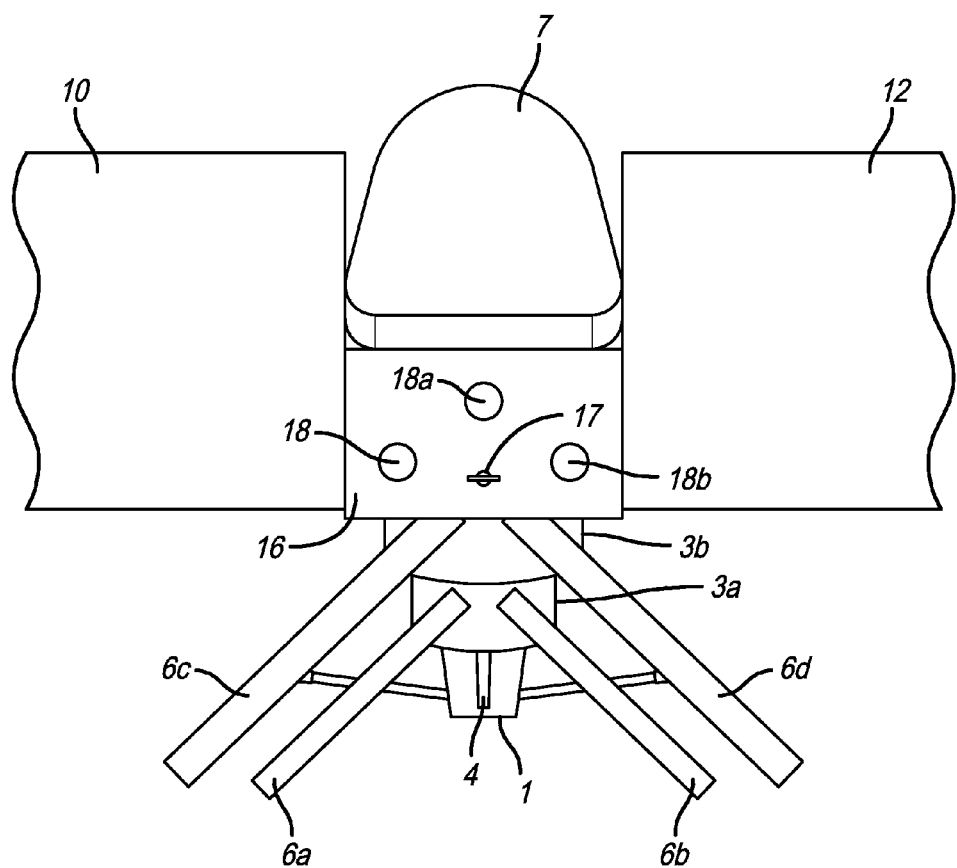
FIG. 5 is a top view of two trays, the clasp and three attachment members.

Referring to FIG. 5, there are shown attachment members 18, 18a and 18b, such as standard male screws. Attachment members may be placed on clasp 16, to which microphone booms, all-purpose arms, gooseneck arms, etc., can be fastened in order to provide extra locations for gear that can be conveniently suspended in the area between the column stand and the performer.

Figure 6:
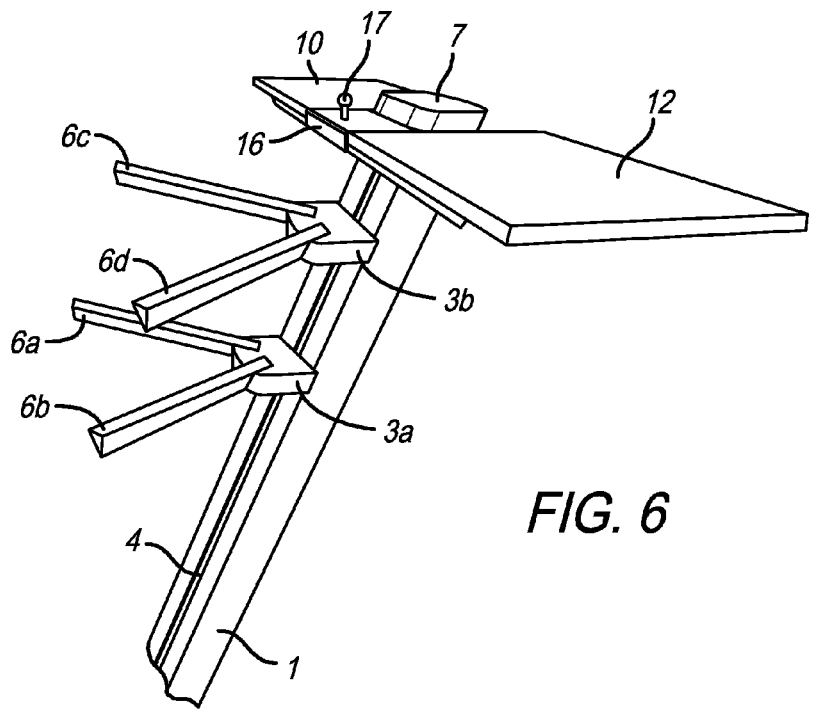
FIG. 6 is a right side perspective view of the column stand, two trays and the clasp.

Referring to FIG. 6 there is shown the stand 1 with three clamps 14, 3a and 3b. Clamps 3a and 3b are holding bars 5a and 5b for holding keyboards. Clamp 14 is holding trays 10 and 12 held by clasp 16 holding angled bars 11 and 13. It can be seen that trays 10 and 12 are placed at the side and back of stand 1 where they do not interfere with the sight and accessibility of the keyboards placed underneath and allow laptops and/or other items clearly in sight of the user, which has never before been available. In addition, the manner of securing the trays to the stand as described above, provides an extremely stable, horizontal positioning of the trays.

Back rise members can be engaged to lift the back part of a laptop sitting on a tray 10 or 12 giving the option to incline a laptop at an angle that may be desirable. Frontal block members can be used to keep a laptop securely in place and can move alternatively in engaged and disengaged positions. Frontal block members are short pins detachably screwed into the surface of a tray in proximity of the front margin. Front block members are semicircular flanges pivoted in their center, in proximity of the front margin which can be engaged and disengaged by being turned counterclockwise and clockwise around their central pivot. When front block members are disengaged they almost completely disappear inside the portion of an angled bar which is soldered underneath the front margin of the tray, leaving only a small protrusion on the left side of the central pivot which may be pushed down to reveal enough of the semicircular flanges to be easily turned counterclockwise.

Referring to FIGS. 7-10, there is shown a left sliding/rotating tray 30 embodiment of the invention. Tray 30 has a hollow track 37 in the center, extending from near the front to near the back of tray 30. Track 37 has a cross-sectional shape of an isosceles trapezoid, as best shown in FIGS. 7A, 7B, 7C and FIGS. 9 and 11, and receives blocking mechanism 35 (A, B, C, D, E) which slides along its length. Tray 30, by being attached to bar 31, 31A, 31B with blocking mechanism 35 (A, B, C, D, E) is able to slide back and forth along hollow track 37 and at the same time rotate around cylindrical bar 31B and be firmly blocked at a wanted position by tightening nuts 35D and 35E.

Angled bar member 31 of sliding/rotating tray 30 has a combination of three parts, 31, 31A and 31B. Part 31 engages into slot 5a of clamp 14 in the same exact way as angled bar 11 of the fixed version of the invention, engages into slot 5a of clamp 14. Part 31 has a triangular cross-sectional shape. The portion of angled bar 31A that is underneath tray 30 is cylindrical, having five or more indentations 31B. Part 31A is the portion of the cylindrical part of the angled bar that have a bigger cross-sectional circular size and 31B is the portion of the cylindrical part of the angled bar that are recessed and have a smaller circular cross-sectional size.

The bottom side of tray 30 has at least five embossed tracks, a wider hollow central track 37 and four other embossed tracks 34 two on each side of hollow track 37. Indentations 31B, are recessed between parts 31A and are deep recesses to receive tracks 34. At any position to which tray 30 slides and rotates on top of indentations 31B, indentations 31B are in contact with tracks 34 and 37. Tracks 34 are kept at all time inserted into indentations 31B by blocking mechanism 35 (A, B, C, D, E) which pushes all the indentations 31B against the respective tracks 34 and 37.

Tracks 34 are integral with tray 30. Blocking mechanism 35 (A, B, C, D, E) slide along hollow track 37 and secure tray 30 at any desired angle and slide location, by pushing parts 31B against respective tracks 34. Blocking mechanism 35 (A, B, C, D, E) is composed of a top part 35A that fits into track 37 and protrudes out from the bottom of tray 30. Screwed to the bottom of part 35A, on both sides of the center are two 35Bs which each have a threaded bolt where nuts 35D and 35E are screwed to 35B. By screwing nuts 35D and 35E to parts 35B, part 35C pushes up toward 35B and pushes 31B from the bottom up against track 34.

Figure 9:
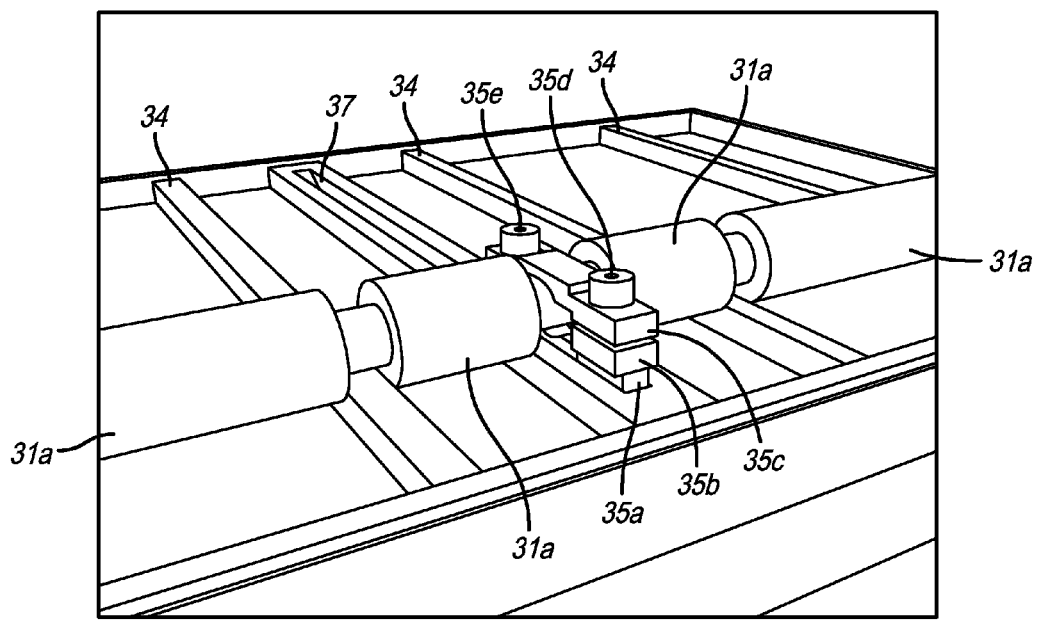
FIG. 9 is a bottom angled view of the sliding/rotating tray.
Figure 10:
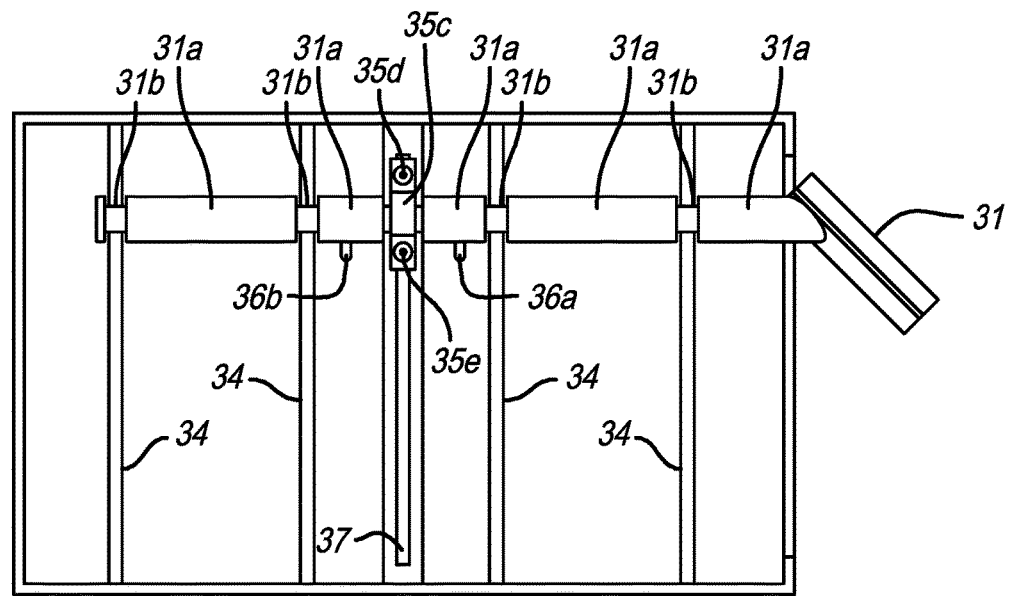
FIG. 10 is a bottom view of the sliding/rotating tray.
Figure 11:
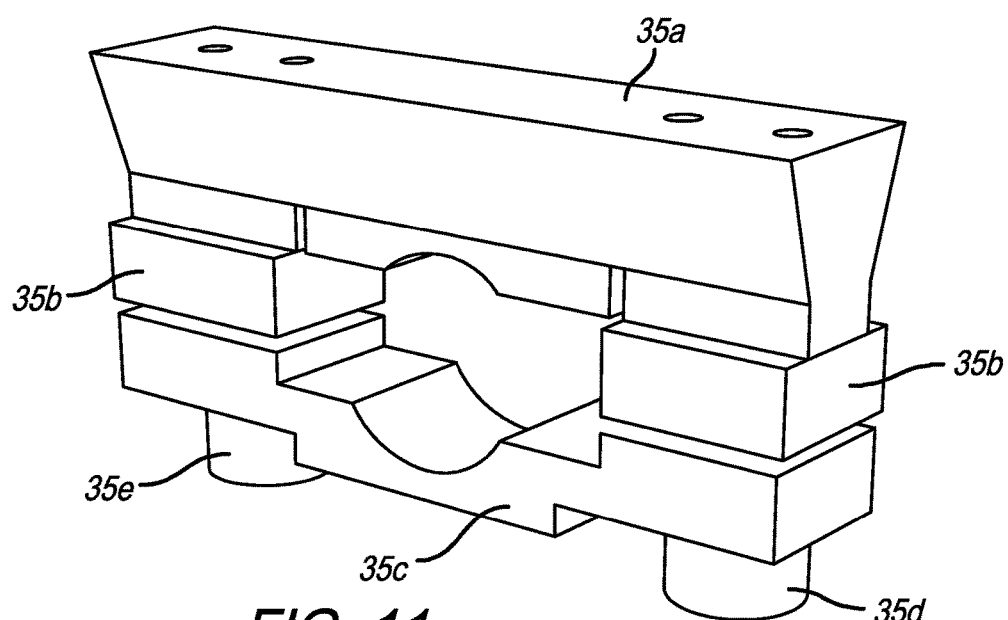
FIG. 11 is a perspective view of the blocking mechanism.

FIGS. 9 and 10 show an example of blocking mechanism 35 with two nuts 35D and 35E. An alternative version may have only one nut, which features part 35C with a hinge utilized on one side in place of one of the two nuts. A third alternative may also be utilized, which features one knob screwed into a threaded hole in the central part of 35C, pushing directly against 31B. In this case part 35C instead of being free to move toward 31B, would be firmly attached to 35B.

Figure 8:
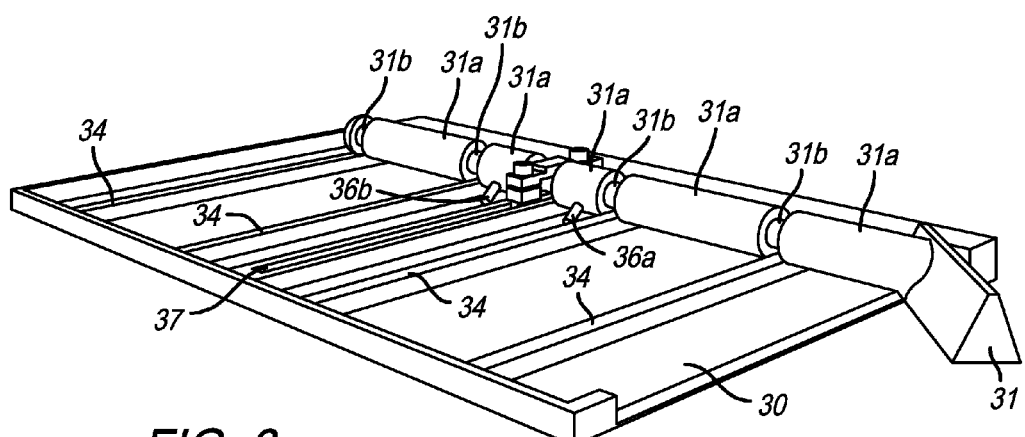
FIG. 8 is a perspective bottom view of the sliding/rotating tray.

Referring to FIGS. 8 and 10, there are shown pins 36A and 36B that are conveniently screwed to part 31A on both sides of blocking mechanism 35 (A, B, C, D, E). Particularly, in FIG. 8 is shown how pins 36A and 36B are screwed at a convenient angle to 31A, preventing tray 30 from falling down in the back.

On the surface of tray 30 a plurality of threaded holes 32 may be drilled, to receive pins 33 to help organize the space on tray 30 by securing a laptop or one or more small electronics devices in desired spots. The option of being able to strategically attach pins 33 on the surface of tray 30 is particularly necessary when tray 30 is rotated and pieces of equipment placed on top of tray 30 could easily slip off if not properly secured. Rows of threaded holes 32 must be created on top of tracks 34 because tracks 34 in the bottom of tray 30 provide necessary thickness to host deep enough threaded holes 32. Ideally the more rows of threaded holes 32 are present on tray 30 the better, since more holes 32 give more options to customize the surface of tray 30. However each row of threaded holes 32 requires a track 34 to be present underneath tray 30 and a relative indentation 31B to be present.

Pins 33 of various sizes and shapes may be provided in order to allow many possible customizations of the surface of tray 30. For example, simple straight pins 33 of at least two lengths, one shorter and one taller, may be provided, short ones to block laptops that usually have a low profile as well as taller ones to block devices with a taller profile. Other types of pins may be offered which may be L-shaped in order to provide a more secure blockage for certain pieces of equipment with an irregular profile. L-shaped pins may also help to hold pages of sheet music open.

Figure 7:
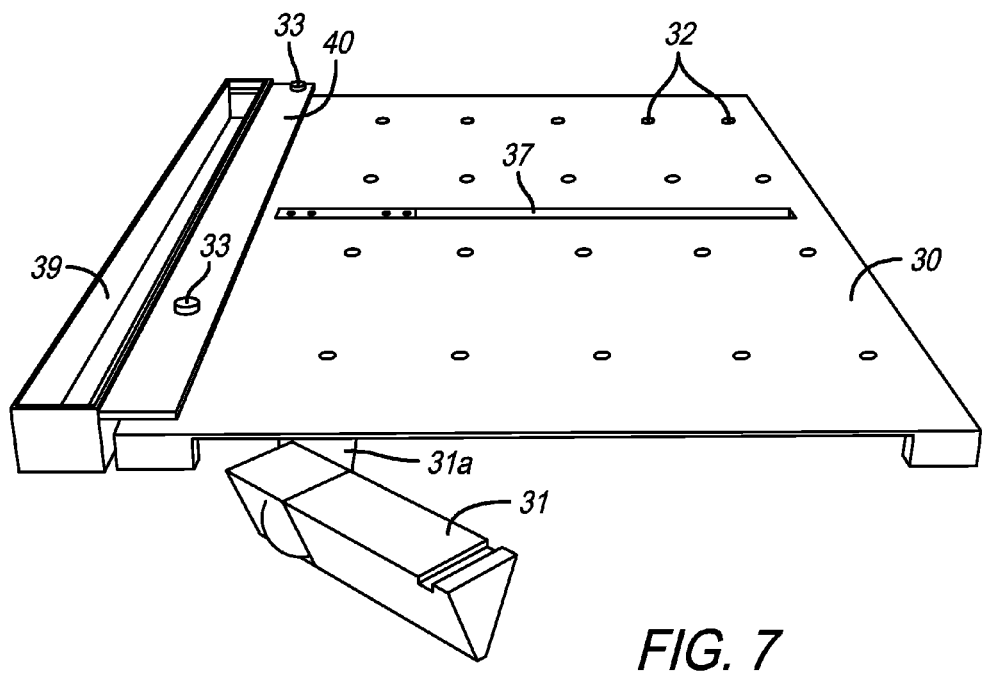
FIG. 7 is a perspective side view of a sliding/rotating tray.
Figure 7A:
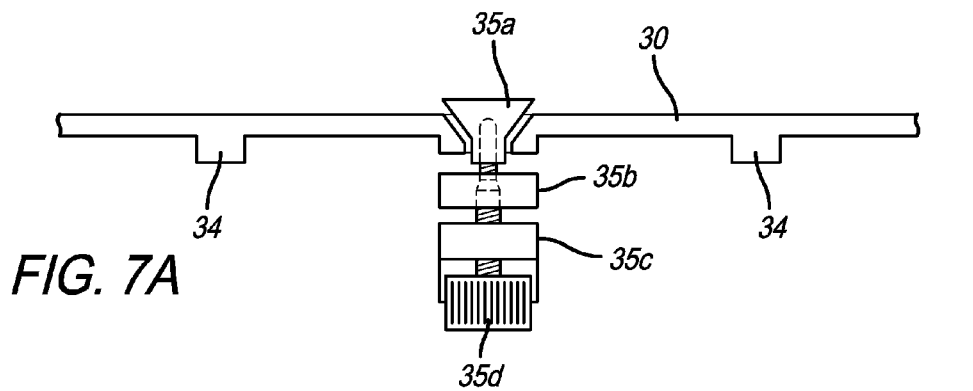
FIGS. 7A and 7B are an exploded cross-section view and a cross-section view of the blocking mechanism and FIG. 7C is a cross-section view of the tray without showing the blocking mechanism.
Figure 7B:
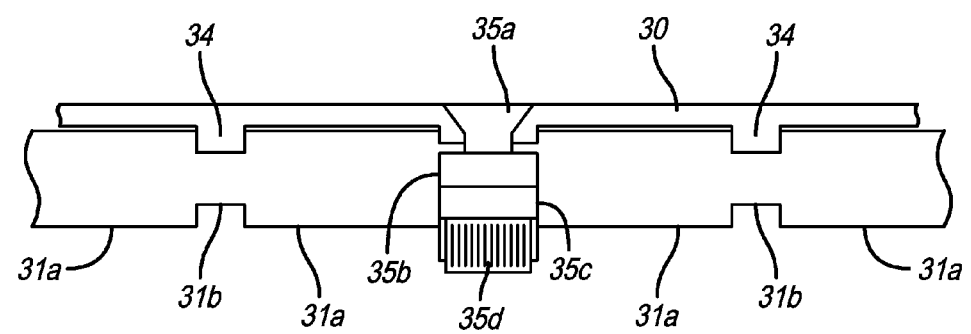
Figure 7C:
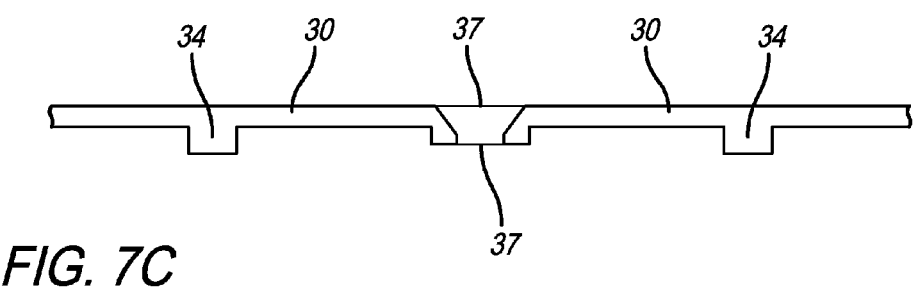

Referring to FIG. 7, there is shown an accessory extension pen and pin holder 39 which is detachably attached to tray 30 with two pins 33. Accessory pen and pin holder 39 features a sliding part 40 which can slide in and become the top of pen & pin holder 39 or slide out and serve as a connecting extension to attach pen and pin holder 39 to tray 30. For example when extension 39 is attached to tray 30, extension 39 can serve as a pen holder while pins 33 can serve as holders for sheet music. The idea of implementing threaded holes on the surface of tray 30 offers a tremendous potential for designing a number of new accessories and extensions that can creatively be attached to tray 30.

While the figures show a left sliding/rotating tray of the invention, a right sliding/rotating tray may also be connected to the column stand in the same manner.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

What is claimed is:

1. A column stand for holding musical keyboards comprising; one or more clamps attached to the column stand, each clamp having one or more slots in the top of the clamp, the slots set at a 45° angle forward of the column stand, a bent angled bar, a portion of which fits into an angled slot, the bent angled bar having a front longitudinal border, one or more trays, each tray being attached on the top of a bent angled bar at the longitudinal border, along the front margin of the tray to provide a fixed, flat and horizontal tray, a clasp attached to the top of each clamp, with a bolt that is screwed into a threaded hole in the clamp, with a threaded nut attached to the bottom of the bolt underneath the clamp, which secures each bent angled bar to the clamp, each bent angled bar being directed so that each tray is located horizontally at the side and back of the column stand.

2. An upright column stand utilized for holding musical keyboards and related musical items, comprising one or more clamps attached to the column stand, each clamp having one or more 45° angled slots in the top of each clamp, one or more bent angled bars fitting into a 45° angled slot and having a front margin, one or more trays, each tray attached to a bent angled bar attached underneath along the front margin of the tray, a clasp attached to the top of each clamp, which secures each bent angled bar to the clamp, the 45° angled slot and the bent angled bar being directed so that each tray is located horizontally at the side and back of the column stand.

3. The column stand of claim 2 in which the clasp is attached to the top of the clamp with a bolt screwed into a threaded hole drilled into the clamp.

4. The column stand of claim 2 in which the clasp is attached to the top of the clamp with a hole through the clamp, a threaded bolt through the hole and a threaded nut attached to the bottom of the bolt underneath the clamp.

5. The column stand of claim 2 in which an L-shaped clasp is attached to the clamp, the L-shaped clasp having a facet on top of the clamp and a facet in front of the clamp, with a bolt attached to the front facet of the clasp, and a flange engaging the bottom of the clamp which is attached to the front facet of the clasp by a nut screwed to the bolt.

6. The column stand of claim 2 in which the bar is soldered, attached underneath along the front margin of the tray.

7. A column stand for holding musical keyboards comprising; one or more clamps attached to the column stand, each clamp having one or more slots in the top of the clamp, the slots set at a 45° angle forward of the column stand, a bent angled bar, a portion of which fits into an angled slot, the bent angled bar having a front longitudinal border, one or more trays, each tray being attached on the top of a bent angled bar at the longitudinal border, along the front margin of the tray to provide a fixed, flat and horizontal tray, in which an L-shaped clasp is attached to the clamp, the L-shaped clasp having a facet on top of the clamp and a facet in front of the clamp, with a bolt attached to the front facet of the clasp, and a flange engaging the bottom of the clamp which is attached to the front facet of the clasp by a nut screwed to the bolt.

* * * * *